US 12,138,698 B2

(12) United States Patent
Fukinuki et al.

(10) Patent No.: US 12,138,698 B2
(45) Date of Patent: Nov. 12, 2024

(54) RECIPROCATING SAW (71) Applicant: Hilti Aktiengesellschaft, Schaan (LI)

(72) Inventors: Masatoshi Fukinuki, Jiangsu (CN);
Yang Zhou, Jiangsu (CN); Hao Gao,
Jiangsu (CN)

(73) Assignee: Hilti Aktiengesellschaft, Schaan (LI)

( * ) Notice: Subject to any disclaimer, the term of this patent is extended or adjusted under 35 U.S.C. 154(b) by 386 days.

(21) Appl. No.: 17/297,812

(22) PCT Filed: Dec. 12, 2019

(86) PCT No.: PCT/CN2019/124890
§ 371 (c)(1),
(2) Date: May 27, 2021

(87) PCT Pub. No.: WO2020/119767
PCT Pub. Date: Jun. 18, 2020

(65) Prior Publication Data
US 2021/0394288 A1 Dec. 23, 2021

(30) Foreign Application Priority Data

Dec. 12, 2018 (CN) .......................... 201811514888.5
Feb. 11, 2019 (CN) .......................... 201910110183.5

(51) Int. Cl.
*B23D 51/01* (2006.01)
*B23D 49/16* (2006.01)
(Continued)

(52) U.S. Cl.
CPC ........... *B23D 51/01* (2013.01); *B23D 49/162* (2013.01); *B25F 5/008* (2013.01); *H02K 7/075* (2013.01); *H02K 7/145* (2013.01)

(58) Field of Classification Search
None
See application file for complete search history.

(56) References Cited

U.S. PATENT DOCUMENTS 2,639,737 A 5/1953 Forsberg et al.
3,971,132 A * 7/1976 Griffies ................ B23D 49/165
30/393
(Continued)

FOREIGN PATENT DOCUMENTS

CN 1496772 A 5/2004
CN 1759990 A 4/2006
(Continued)

OTHER PUBLICATIONS

English translation of CN 107107324 A, date of publication: Aug. 29, 2017.*
(Continued)

*Primary Examiner* — Hwei-Siu C Payer
(74) *Attorney, Agent, or Firm* — Davidson Kappel LLC (57) ABSTRACT

A reciprocating saw includes a housing; a motor, disposed in a housing accommodating space and having a winding extending along a first straight direction; a first transmission wheel connected to the motor; and an input shaft driven by the motor to carry out reciprocating motion. The first transmission wheel is fixed in the accommodating space along a support shaft extending along a second straight direction, and is driven by the motor to rotate about a second straight line; the winding includes a first end and a second end along the first straight direction, a first plane perpendicular to the first straight line passes through a first end face of the first end and a second end perpendicular to the first straight line passes through a second end face of the second end; the first plane is parallel with the second plane, and the winding is located between the first plane and the second plane; at least part of the support shaft is located between the first plane and the second plane.

21 Claims, 7 Drawing Sheets

(51) Int. Cl.
  *B25F 5/00*   (2006.01)
  *H02K 7/075*  (2006.01)
  *H02K 7/14*   (2006.01)

(56) References Cited

U.S. PATENT DOCUMENTS

| | | | |
|---|---|---|---|
| D506,117 S | 6/2005 | Sun et al. | |
| 2003/0163924 A1* | 9/2003 | Hempe | B23D 49/16 |
| | | | 30/388 |
| 2004/0117993 A1* | 6/2004 | Armstrong | B23D 49/165 |
| | | | 30/392 |
| 2005/0076509 A1 | 4/2005 | Delfini et al. | |
| 2005/0249564 A1 | 11/2005 | Van Bergen et al. | |
| 2008/0104853 A1* | 5/2008 | Hunger | B23D 51/01 |
| | | | 30/392 |
| 2010/0031517 A1 | 2/2010 | Fukinuki et al. | |
| 2010/0162579 A1 | 7/2010 | Naughton et al. | |
| 2014/0082949 A1 | 3/2014 | Kocsis et al. | |
| 2016/0129509 A1 | 5/2016 | Xu et al. | |
| 2017/0086396 A1 | 3/2017 | Burch et al. | |
| 2018/0250789 A1 | 9/2018 | Masatoshi et al. | |
| 2018/0301957 A1 | 10/2018 | Hara et al. | |
| 2021/0394288 A1* | 12/2021 | Fukinuki | H02K 7/145 |

FOREIGN PATENT DOCUMENTS

| | | | |
|---|---|---|---|
| CN | 201226692 Y | | 4/2009 |
| CN | 101642834 A | | 2/2010 |
| CN | 103213106 A | | 7/2013 |
| CN | 203254010 U | | 10/2013 |
| CN | 103846499 A | | 6/2014 |
| CN | 204658374 U | | 9/2015 |
| CN | 107107324 A | * | 8/2017 |
| CN | 206614493 U | | 11/2017 |
| CN | 207669248 U | | 7/2018 |
| CN | 108527092 A | | 9/2018 |
| DE | 20208553 U1 | | 10/2003 |
| EP | 1637289 A1 | | 3/2006 |
| GB | 2181693 B | | 5/1989 |
| JP | 2543355 B2 | | 10/1996 |
| TW | M268153 U | | 6/2005 |
| WO | WO2014/031539 A1 | | 2/2014 |
| WO | WO 2019/116120 A1 | * | 6/2019 |

OTHER PUBLICATIONS

International Search Report of PCT/CN2019/124890, dated Feb. 26, 2020.
Jiliang Mo, Oct. 31, 2002, "*Pipe fitter*", Vocational Skills Appraisal Textbook, Beijing: China Labour and Social Security Press, Oct. 2002; p. 9-10, see translation.

* cited by examiner

RECIPROCATING SAW

The present application is a national phase of PCT/CN2019/124890, filed Dec. 12, 2019 and claims the priority of Chinese patent application nos. 201811514888.5 submitted to the Chinese Patent Office on Dec. 12, 2018 and 201910110183.5 submitted to the Chinese Patent Office on Feb. 11, 2019, the entire contents of which are incorporated herein by reference.

TECHNICAL FIELD

The present application relates to a reciprocating saw.

BACKGROUND

As a type of cutting tool, a reciprocating saw relies on the reciprocation of a saw blade connected to the reciprocating saw to cut a workpiece. As the output of the reciprocating saw is a type of reciprocation, structures such as an electric motor and a transmission mechanism must be present in the interior thereof. In addition, since a reciprocating saw will generally experience significant vibration while outputting reciprocation, some reciprocating saws also contain a vibration reduction structure. As will be understood, when all of the abovementioned structures are installed inside a housing of the reciprocating saw, they will take up a significant amount of space, and consequently the reciprocating saw will have a large overall size, making operation inconvenient for a user. The question of how to reduce the overall size of the reciprocating saw so that the user can use it for a long period of time with greater comfort is a technical problem that is in urgent need of a solution at the present time.

SUMMARY OF THE INVENTION

The present application provides a reciprocating saw that is capable of making full use of an accommodating space in a housing and can be used conveniently by a user.

The present invention provides a reciprocating saw, comprising: a housing, formed with an accommodating space and a first gripping part for a user to grip; an electric motor, disposed in the accommodating space and comprising a winding extending in the direction of a first straight line; a first transmission wheel, disposed in the accommodating space and connected to the electric motor; an output shaft, which reciprocates in a front-rear direction under the driving action of the electric motor; the first transmission wheel is fixed in the accommodating space by a support shaft extending in the direction of a second straight line, and is rotatable about the second straight line under the driving action of the electric motor; the winding comprises a first end and a second end in the direction of the first straight line, and a first plane perpendicular to the first straight line and passing through a first end face of the first end is defined; a second plane perpendicular to the first straight line and passing through a second end face of the second end is defined, the first plane being parallel to the second plane, and the winding being located between the first plane and the second plane; and the support shaft is at least partially located between the first plane and the second plane.

The following features advantageously may be further provided.

The winding is parallel to or intersects the support shaft, and the distance by which the support shaft is located between the first plane and the second plane is greater than 0 mm and less than or equal to 20 mm.

The winding is parallel to or intersects the support shaft, and the distance by which the support shaft is located between the first plane and the second plane is greater than 0 mm and less than or equal to 10 mm.

The support shaft has one end connected to the first transmission wheel and another end rotatably connected to a gearbox.

The reciprocating saw further comprises a second transmission wheel connected in a fixed manner to the first transmission wheel.

The second transmission wheel comprises:
an eccentric block, formed with a connecting part which is connected to the first transmission wheel;
a transmission pin, extending in a third direction and being formed on or connected to that side of the second transmission wheel which is remote from the eccentric block.

The first transmission wheel is formed with a mating part which mates with the eccentric block and a connecting hole which is connected to the connecting part; when the second transmission wheel is connected to the first transmission wheel, the eccentric block is inserted into the mating part; and the connecting part is connected in the connecting hole.

The accommodating space formed by the housing comprises a first accommodating space and a second accommodating space; the electric motor and the first transmission wheel are at least partially disposed in the first accommodating space, and the first gripping part is formed around the second accommodating space.

The housing comprises a first housing and a second housing, which form the first accommodating space and the second accommodating space after being connected by means of a fixing member.

An air inlet and an air outlet are also formed on the housing, a fan is provided on the electric motor, and when the electric motor drives the fan to rotate, a cooling airflow flowing in through the air inlet and flowing out through the air outlet is formed.

The first accommodating space and the second accommodating space are at least partially in communication with each other, and form a channel for the cooling airflow to pass through.

A circuit board is further comprised, which separates at least parts of the first accommodating space and the second accommodating space and is at least partially located at a junction of the first accommodating space and the second accommodating space.

The reciprocating saw further comprises a balancing block extending in the direction of a fourth straight line; the fourth straight line being substantially parallel to the output shaft.

The first gripping part extends substantially in the direction of a fifth straight line, an acute included angle formed by the fifth straight line and the fourth straight line being greater than or equal to 15° and less than or equal to 35°.

The first gripping part extends substantially in the direction of a fifth straight line, an acute included angle formed by the fifth straight line and the fourth straight line being 25°.

The housing is further formed with a second gripping part for a user to grip; the second gripping part extends substantially in the direction of a sixth straight line, an acute included angle formed by the sixth straight line and the fourth straight line being greater than or equal to 55° and less than or equal to 75°.

The second gripping part is formed with a gripping groove in the direction of the sixth straight line.

The housing is further formed with a second gripping part for a user to grip; the second gripping part extends substantially in the direction of a sixth straight line, an acute included angle formed by the sixth straight line and the fourth straight line being 60°.

In the reciprocating saw provided in the present application, the electric motor shaft and support shaft advantageously can be arranged in parallel, and the projections thereof in a plane perpendicular to the direction of the output shaft can partially overlap, such that full use is made of the space inside the housing, and the volume of the housing that is used to form the accommodating space can be reduced, thereby reducing the size of the tool overall.

DETAILED DESCRIPTION

Figure 1:
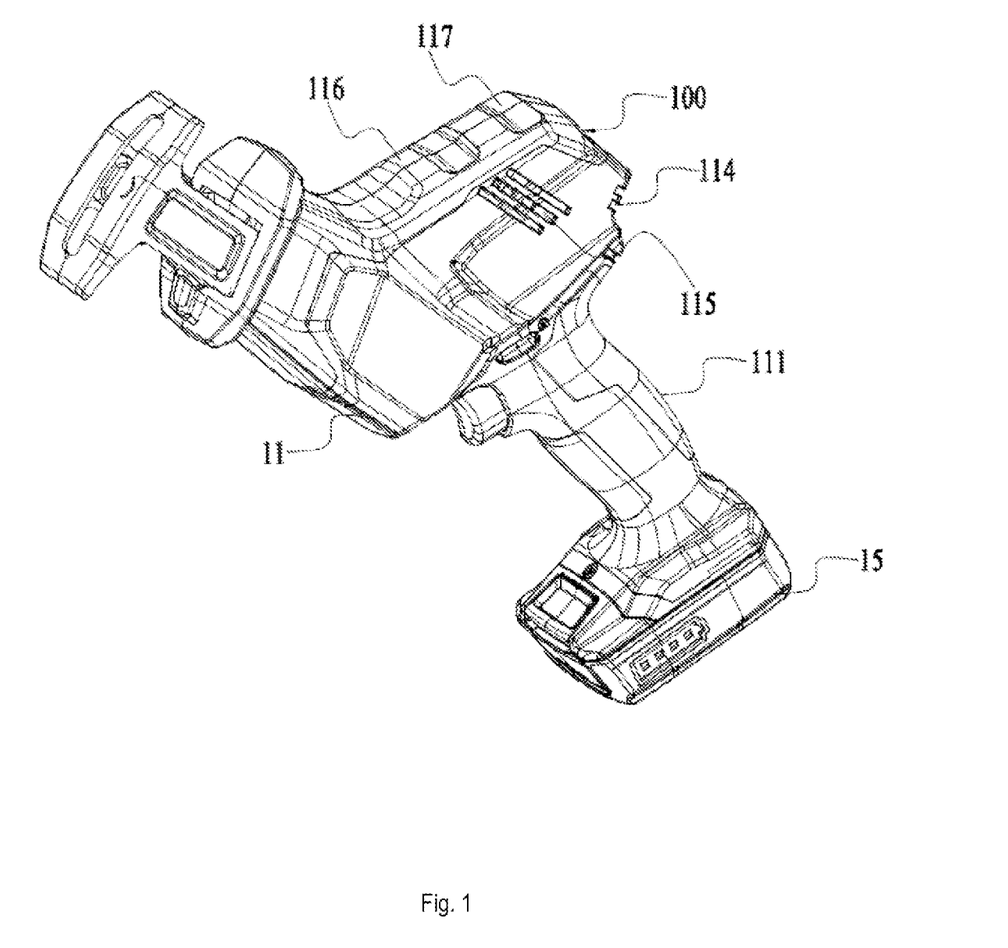
FIG. 1 is a three-dimensional drawing of a reciprocating saw provided in an embodiment of the present application.
Figure 2:
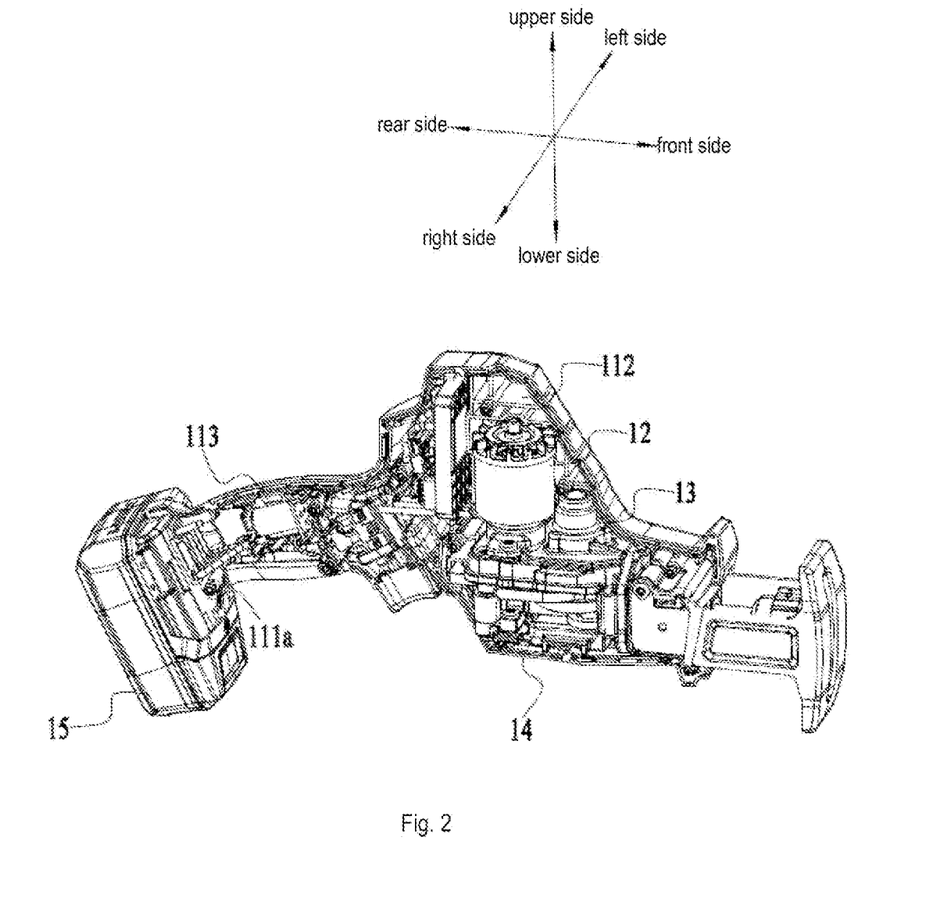
FIG. 2 is a three-dimensional drawing of the reciprocating saw in FIG. 1, with part of the housing removed.

A reciprocating saw 100 shown in FIGS. 1 and 2 comprises: an electric motor 12, a housing 11, a transmission means 13, a motive power output part 14 and a power supply means 15. The housing 11 is formed with an accommodating space, for installing the electric motor 12 and other components. The electric motor 12 is configured to supply motive power to the reciprocating saw 100. The transmission means 13 is configured to transfer the motive power of the electric motor 12 to the motive power output part 14, and thereby drive an output shaft 141 (see, e.g., FIG. 4) of the reciprocating saw 100 to reciprocate in order to cut an object. As will be understood, in this embodiment, a working attachment connected to the reciprocating saw 100 is also included; different working attachments can be connected to the reciprocating saw 100 in order to cut different objects. The reciprocating saw 100 further comprises a power supply assembly which supplies energy to the electric motor 12; in this embodiment, the power supply assembly is specifically a battery pack connected to the reciprocating saw 100. Of course, in other embodiments, it could also be an AC connecting cable connected to the reciprocating saw 100. The housing 11 is also formed with a first gripping part 111 for gripping, and a control button for operation is connected to the first gripping part 111, for the purpose of controlling an operating state of the reciprocating saw 100 via the control button.

As shown in FIG. 2, in order to clearly explain the technical solution of the present application, the following are further defined: an upper side, a lower side, a left side, a right side, a front side and a rear side. The housing 11 is formed with a first accommodating space 112 and a second accommodating space 113 extending in the front-rear direction. The first accommodating space 112 is used for installing motive power components such as the electric motor 12 and the transmission means 13; the second accommodating space 113 is used for installing components such as an operating member, electronic components 161 and a circuit board 16 (see, e.g., FIG. 4). The first gripping part 111 for a user to grip is formed by the housing 11 which encloses the second accommodating space 113. A connecting end 111a connected to the power supply means 15 is also formed or connected at the rear side of the first gripping part 111. The entire reciprocating saw 100 is arranged substantially in the front-rear direction. In fact, the first gripping part 111 is located between the connecting end 111a and the first accommodating space 112. In order to install large-volume components such as the electric motor 12 and the transmission means 13, the first accommodating space 112 formed in the housing 11 is large, and extends in the up-down direction shown in the figure, thereby increasing the size of the tool overall, and also affects the sight of the user during use, thus hindering operation by the user. As will be understood, the first accommodating space 112 is larger than the second accommodating space 113; moreover, the first accommodating space 112 and second accommodating space 113 are in communication with each other, and are formed with a connecting channel.

Figure 3:
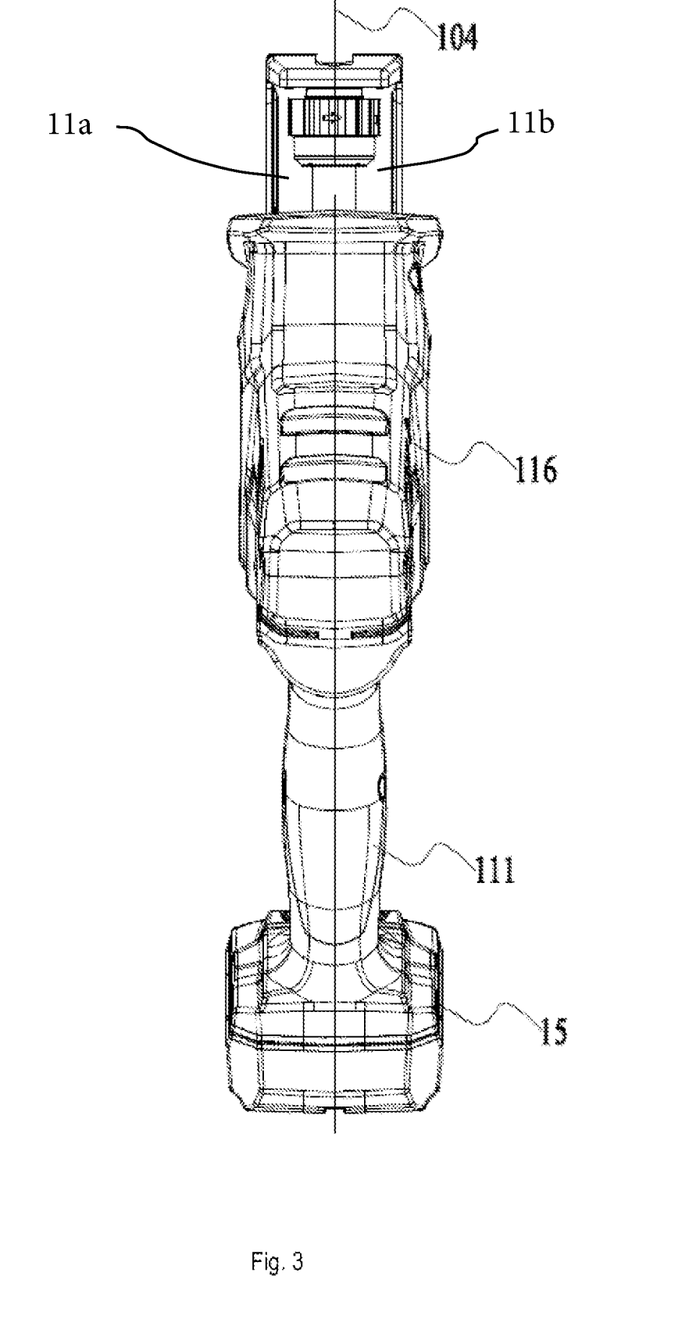
FIG. 3 is a rear view of the reciprocating saw in FIG. 1.
Figure 4:
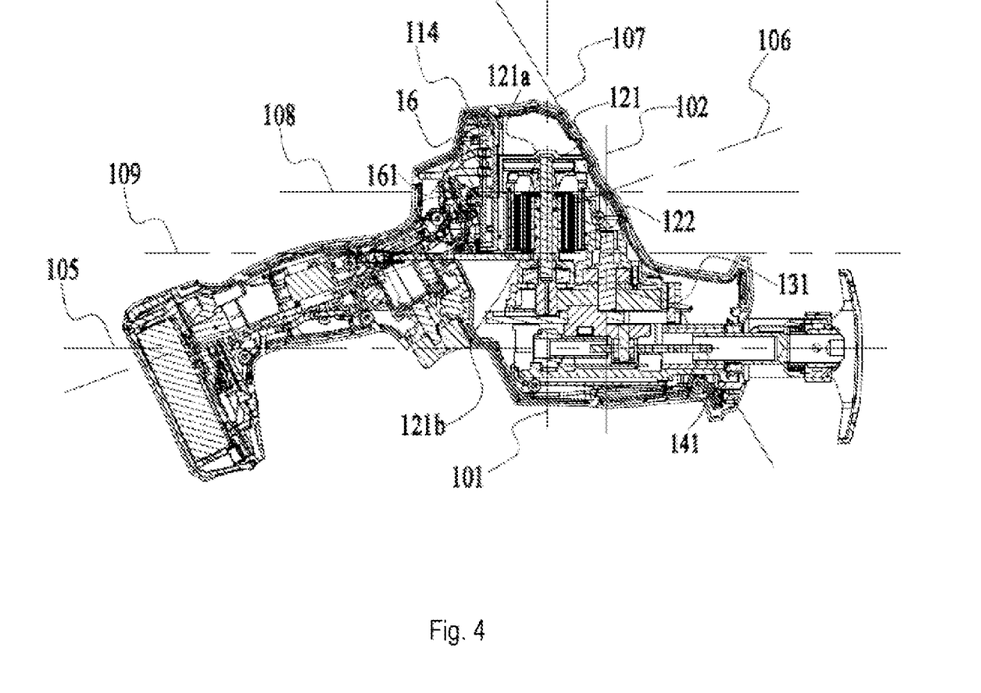
FIG. 4 is a sectional drawing of the reciprocating saw in FIG. 1.

As shown in FIGS. 2 to 4, in order to reduce the size of the first accommodating space 112, and avoid excessive extension of the housing 11 in the up-down direction or left-right direction for the purpose of forming the first accommodating space 112 for accommodating components such as the electric motor 12 and transmission means 13, in a direction of extension of an electric motor shaft 121, the electric motor 12 comprises a winding 122 distributed around the electric motor shaft 121. The winding 122 extends in the direction of a first straight line 101, and a direction of extension of the winding 122 is substantially parallel to the direction of extension of the electric motor shaft 121. The first winding 122 and a support shaft 131 of the transmission means 13 are provided with partially overlapped regions. In fact, the electric motor 12 comprises a first end 121a and a second end 121b in the direction of the first straight line 101, and a first end face 121c (see, e.g, FIG. 6) perpendicular to the first straight line 101 and passing through the first end 121a is defined as a first plane 108; a second end face 121d perpendicular to the first straight line 101 and passing through the second end 121b is defined as a second plane 109, the first plane 108 being parallel to the second plane 109, and the winding 122 being located between the first plane 108 and second plane 109; the support shaft 131 is also at least partially located between the first plane 108 and second plane 109, such that the winding 122 and support shaft 131 have a region of overlap in the up-down direction. Specifically, the distance by which the support shaft 131 is located between the first plane 108 and the second plane 109 is greater than 0 mm and less than or equal to 20 mm. Furthermore, the distance by which the support shaft 131 is located between the first plane 108 and the second plane 109 is greater than 0 mm and less than or equal to 10 mm. This configuration enables the space 112 in the first accommodating space to be utilized effectively, such that the space in the up-down direction and the space in the front-rear direction inside the housing 11 can both be utilized in a repeated manner, avoiding the formation of large spaces in the up-down direction and front-rear direction respectively for the purpose of adapting to the installation spaces of the electric motor 12 and transmission means 13, such that the positions of two spaces that were originally used to respectively accommodate the electric motor 12 and transmission means 13 intersect or overlap in the up-down direction and front-rear direction, thereby effectively reducing the first accommodating space 112, and thus reducing the size of the tool overall. In some optional embodiments, the electric motor shaft 121 and support shaft 131 are parallel or intersect obliquely in the up-down direction, such that the winding 122 and support shaft 131 are also parallel or intersect obliquely in the up-down direction. Specifically, the winding 122 and support shaft 131 are arranged in parallel in the up-down direction.

As shown in FIG. 3, in this embodiment, the housing 11 of the reciprocating saw 100 further comprises a symmetry plane 104 that is symmetric with respect to the left-right direction. The housing 11 forms a first housing 11a and a second housing 11b with respect to the symmetry plane 104. After being connected by means of a fixing member, the first housing 11a and second housing 11b form the first accommodating space 112 and second accommodating space 113. In this embodiment, the junction of the first accommodating space 112 and second accommodating space 113 is at least partially divided by the circuit board 16. An air inlet 114 and an air outlet 115 (see, e.g., FIG. 1) are also formed on the housing 11. When the reciprocating saw 100 is operating, a fan is disposed on the electric motor 12, and the electric motor drives the fan to rotate so as to generate a cooling airflow that connects the interior of the housing 11 with the outside. The cooling airflow enters the interior of the housing 11 from the air inlet 114, and after separately flowing through the circuit board 16 and electric motor 12, flows out through the air outlet 115. In this embodiment, the circuit board 16 and electric motor 12 are electrically connected and at the same time are located in an open space; the division of the junction of the first accommodating space 112 and second accommodating space 113 by the circuit board 16 can actually extend the path travelled by the cooling airflow. In this process, the cooling airflow flows fully through the electronic components 161 on the circuit board 16, and after carrying out heat from the electronic components 161, enters the electric motor 12 and carries heat out of the electric motor 12, flowing out through the air outlet 115 at high speed. In fact, at the same time as dividing the interior space of the housing 11, the circuit board 16 also separates the electronic components 161 on the circuit board 16 from the electric motor 12, thus avoiding interference between the heat of the electronic components 161 and the heat of the electric motor 12, such that the reciprocating saw 100 can operate more stably.

Figure 5:
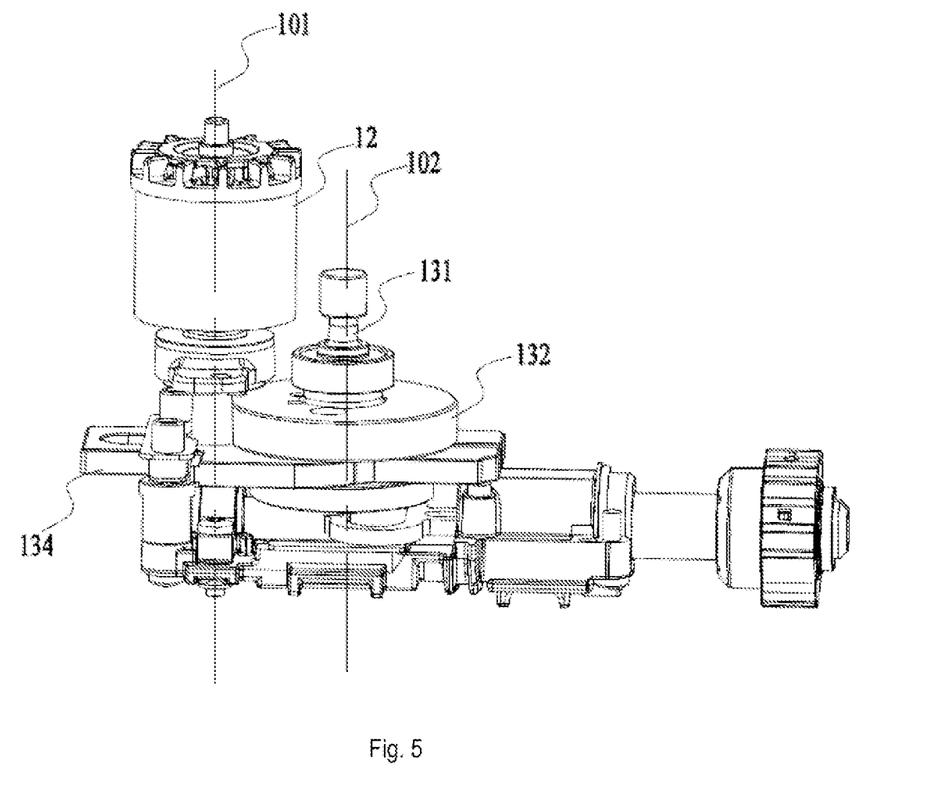
FIG. 5 is a three-dimensional drawing of the internal structure of the reciprocating saw in FIG. 1.
Figure 6:
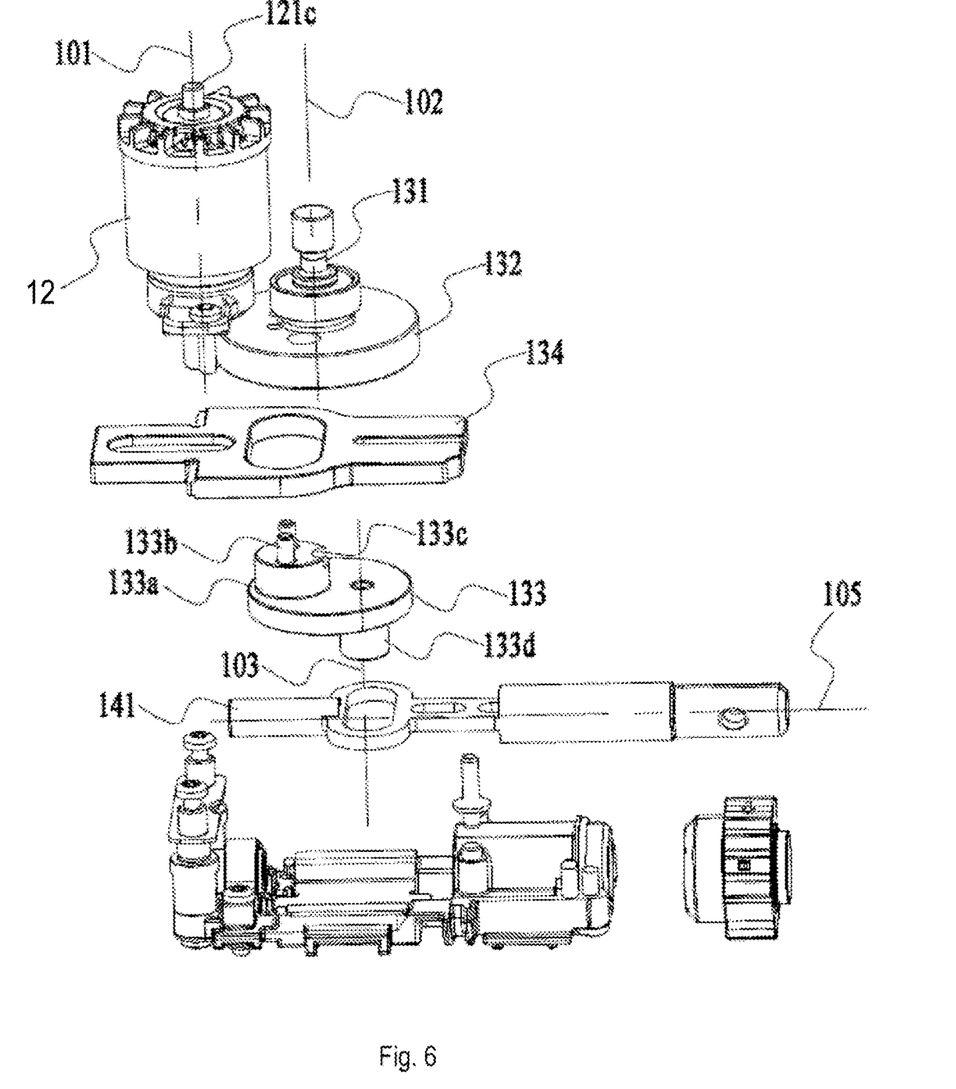
FIG. 6 is an exploded schematic drawing of the internal structure of the reciprocating saw in FIG. 5.

As shown in FIGS. 4 to 6, in the up-down direction, the electric motor 12 is disposed at the upper side, and in the direction of the first straight line 101 in the direction in which the electric motor shaft 121 lies, a first transmission wheel 132 is disposed parallel to the electric motor shaft 121, the first transmission wheel 132 being meshed with a transmission part at a lower end of the electric motor shaft 121, such that under the driving action of the electric motor 12, the first transmission wheel 132 rotates about a second straight line 102 parallel to the direction of the first straight line 101. The support shaft 131 passes through the first transmission wheel 132 in the direction of the second straight line 102. One end of the support shaft 131 is connected in a fixed manner to the first transmission wheel 132 and penetrates the first transmission wheel 132 in the direction of the second straight line 102, while the other end is rotatably connected to a gearbox, such that the first transmission wheel 132 can rotate, supported by the support shaft 131, about the second straight line 102 under the driving action of the electric motor 12.

Figure 7:
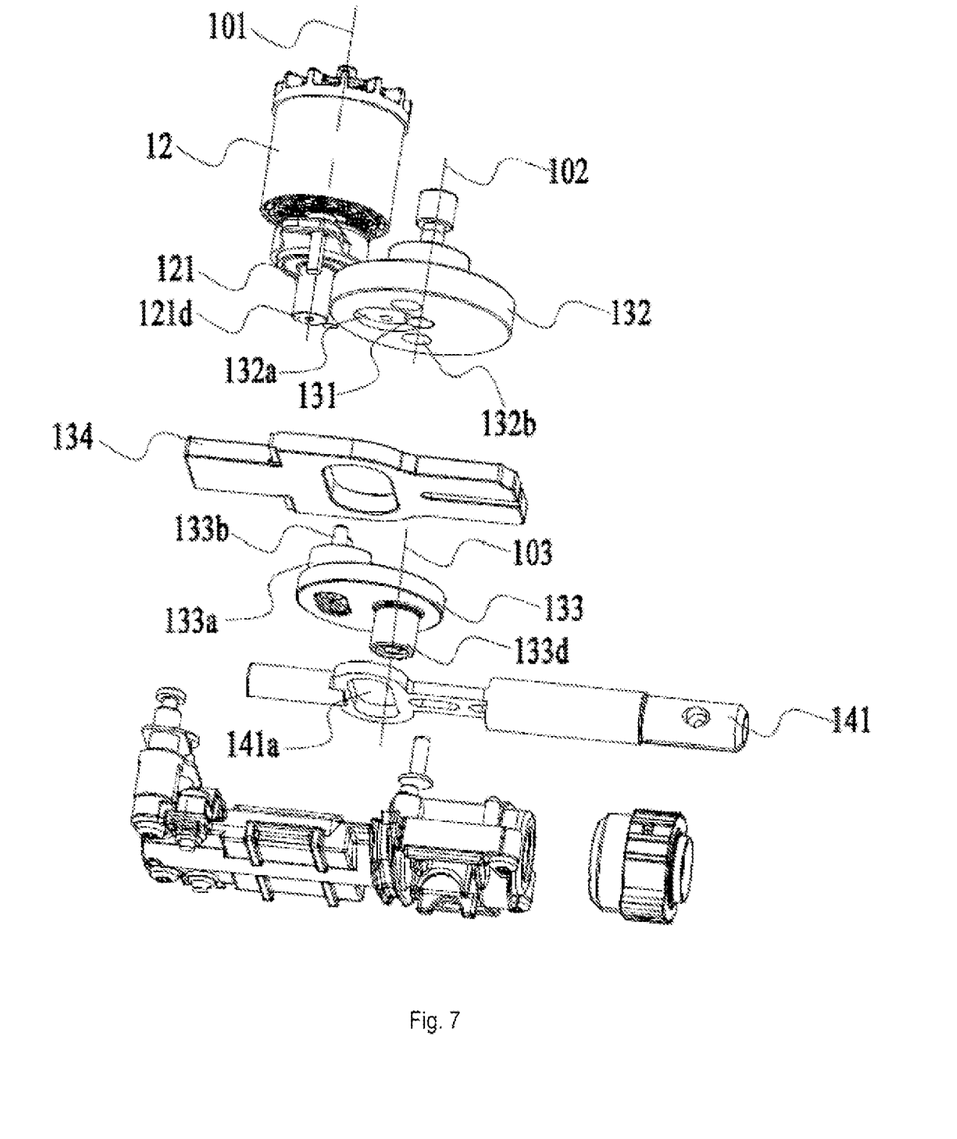
FIG. 7 is an exploded schematic drawing of the internal structure of the reciprocating saw in FIG. 6, viewed from another angle.

In order to achieve reciprocation of the reciprocating saw 100, a second transmission wheel 133 is also connected to the first transmission wheel 132. In a diametric direction, the second transmission wheel 133 is provided with an eccentric block 133a and a transmission pin 133d respectively. The eccentric block 133a and transmission pin 133d are respectively located at positions remote from the circle center in the diametric direction of the second transmission wheel 133. The eccentric block 133a is disposed on that side of the first transmission wheel 132 which is close to the first transmission wheel 132, and a connecting part 133b for fixed connection to the first transmission wheel 132 is also connected to or formed on the eccentric block 133a. The eccentric block 133a is a cylinder, and a notch 133c is formed at one side of the cylinder. The transmission pin 133d is disposed at that side of the second transmission wheel 133 which is remote from the first transmission wheel 132. The transmission pin 133d extends in the direction of a third straight line 103. It must be emphasized here that each pair of the first straight line 101, second straight line 102 and third straight line 103 are parallel. A mating part 132a (see, e.g., FIG. 7) that mates with the eccentric block 133a is formed on the first transmission wheel 132; the mating part 132a is sunken in an upward direction from that side of the first transmission wheel 132 which is close to the second transmission wheel 133, and is specifically a cylinder that mates with the eccentric block 133a. The mating part 132a and the support shaft 131 penetrating the first transmission wheel 132 also have a region of overlap, within which region of overlap the support shaft 131 is not sunken. The first transmission wheel 132 is also formed with a connecting hole 132b for insertion of the connecting part 133b. When the second transmission wheel 133 is connected in a fixed manner to the first transmission wheel 132, the eccentric block 133a can be inserted into the mating part 132a, and the connecting part 133b can be connected in the connecting hole 132b, thereby enabling the first transmission wheel 132 and second transmission wheel 133 to be fixed together. At the same time, that part of the support shaft 131 which is located at the mating part 132a is inserted into the notch 133c of the eccentric block 133a, and can transfer torque of the first transmission wheel 132 to the second transmission wheel 133. Thus, the first transmission wheel 132 can drive the second transmission wheel 133 to rotate about the second straight line 102.

The eccentric block 133a is disposed at a position remote from the circle center of the second transmission wheel 133; therefore, relative to the circle center of the second transmission wheel 133, when the second transmission wheel 133 rotates, the rotation is actually eccentric. When the first transmission wheel 132 and second transmission wheel 133 are rotating at high speed, the unit formed by the first transmission wheel 132 and second transmission wheel 133 will experience significant shaking due to the eccentric motion. In this embodiment, a balancing block 134 is also disposed between the first transmission wheel 132 and second transmission wheel 133. The balancing block 134 extends substantially along a fourth straight line 105 parallel to the direction of the output shaft 141. As will be understood, the fourth straight line is perpendicular to the first straight line 101, the second straight line 102 and the third straight line 103. The balancing block 134 is formed with a through-hole, can be passed through by the eccentric block 133a and is connected between the first transmission wheel 132 and second transmission wheel 133. When the first transmission wheel 132 drives the second transmission wheel 133 to rotate at high speed, the balancing block 134 can balance the shaking of the output shaft 141, such that the entire reciprocating saw 100 operates in a relatively steady state.

During rotation of the second transmission wheel 133, the transmission pin 133d formed on or connected to the second transmission wheel 133 can output circumferential motion centered at any point on the axis of the support shaft 131, the radius of this circumferential motion being the distance from the axis of the transmission pin 133d to the axis of the support shaft 131. A transmission hole 141a which mates with the transmission pin 133d is also formed in the output shaft 141. When passed through the transmission hole 141a, the transmission pin 133d can drive the output shaft 141 to reciprocate in the front-rear direction; when a working attachment is connected to a connecting end of the output shaft 141, the output shaft 141 drives the working attachment to reciprocate, in order to cut a workpiece.

In this embodiment, the first gripping part 111 extends substantially in the direction of a fifth straight line 106 located in the symmetry plane 104. Within the symmetry plane 104, an acute included angle formed by the fifth straight line 106 and fourth straight line 105 is greater than or equal to 15° and less than or equal to 35°. Within this range of included angles, the user can grip the reciprocating saw 100 more comfortably. Optionally, when the acute included angle formed by the fifth straight line 106 and fourth straight line 105 is greater than or equal to 20° and less than or equal to the user can grip the reciprocating saw 100 with even greater comfort. In this embodiment, the acute included angle formed by the fifth straight line 106 and fourth straight line 105 is 25°, so the user can grip the reciprocating saw 100 in the most comfortable state.

In fact, in this embodiment, that part of the housing 11 which forms the first accommodating space 112 is also formed with a second gripping part 116 for the user to grip. Under ordinary cutting conditions, the user will be able to carry out a cutting job by gripping the first gripping part 111, but in the case of certain workpieces with a harder texture or rougher surface, it is necessary for the user to grip the first gripping part 111 with one hand while gripping the second gripping part 116 with the other hand, so as to carry out a cutting operation in a safer and steadier fashion. As shown in FIG. 4, the second gripping part 116 extends substantially in the direction of a sixth straight line 107, and is formed with gripping grooves 117 according to the gripping requirements of the user; the gripping grooves 117 are distributed substantially in accordance with the gripping direction of the fingers and the gaps therebetween, to make it easy for the user to grip the reciprocating saw 100 more firmly. To enable the user to grip the reciprocating saw 100 more comfortably, an acute included angle formed by a direction of extension of the second gripping part 116 and the direction of the fourth straight line 105 is greater than or equal to 55° and less than or equal to 75°. Optionally, the acute included angle formed by a direction of extension of the second gripping part 116 and the direction of the fourth straight line 105 in this embodiment is 60°. With this design, the user will be able to grip the reciprocating saw 100 for a long period of time in a more favorable state. The reciprocating saw 100 with this design can adapt to more complex working conditions, and the user will be more comfortable during operation.

What is claimed is:

1. A reciprocating saw comprising:
   a housing formed with an accommodating space and a first gripping part for a user to grip, the housing also formed with a second gripping part extending in a direction of a second gripping part straight line, the second gripping part formed with a gripping groove transverse to the direction of the second gripping part straight line;
   an electric motor disposed in the accommodating space and including a winding extending in a direction of a first straight line;
   a first transmission wheel disposed in the accommodating space and connected to the electric motor;
   an output shaft reciprocating in a front-rear direction under a driving action of the electric motor;
   the first transmission wheel being fixed in the accommodating space by a support shaft extending in a direction of a second straight line, and rotatable about the second straight line under the driving action of the electric motor;
   the electric motor including a first end and a second end in the direction of the first straight line, and a first plane perpendicular to the first straight line and passing through a first end face of the first end being defined; a second plane perpendicular to the first straight line and passing through a second end face of the second end being defined, the first plane being parallel to the second plane, and the winding being located between the first plane and the second plane;
   the support shaft being at least partially located between the first plane and the second plane.

2. The reciprocating saw as recited in claim 1 wherein a distance of the support shaft located between the first plane and the second plane is greater than 0 mm and less than or equal to 20 mm.

3. The reciprocating saw as recited in claim 1 wherein a distance of the support shaft located between the first plane and the second plane is greater than 0 mm and less than or equal to 10 mm.

4. The reciprocating saw as recited in claim 1 wherein the support shaft has one end connected to the first transmission wheel.

5. The reciprocating saw as recited in claim 4 further comprising a second transmission wheel connected in a fixed manner to the first transmission wheel.

6. The reciprocating saw as recited in claim 5 wherein the second transmission wheel includes:
   an eccentric block, formed with a connecting part connected to the first transmission wheel;
   a transmission pin, extending in a direction of a third straight line and being formed on or connected to a side of the second transmission wheel remote from the eccentric block.

7. The reciprocating saw as recited in claim 6 wherein the first transmission wheel is formed with a mating part mating with the eccentric block and a connecting hole connected to the connecting part; when the second transmission wheel is connected to the first transmission wheel, the eccentric block is inserted into the mating part; and
   the connecting part is connected in the connecting hole.

8. The reciprocating saw as recited in claim 1 wherein the accommodating space formed by the housing includes a first accommodating space and a second accommodating space; the electric motor and the first transmission wheel being at least partially disposed in the first accommodating space, and the first gripping part being formed around the second accommodating space.

9. The reciprocating saw as recited in claim 8 wherein the housing includes a first housing and a second housing forming the first accommodating space and the second accommodating space after being connected by a fixing member.

10. The reciprocating saw as recited in claim 8 wherein an air inlet and an air outlet are formed on the housing, a fan being provided on the electric motor, and when the electric motor drives the fan to rotate, a cooling airflow flowing in through the air inlet and flowing out through the air outlet is formed.

11. The reciprocating saw as recited in claim 10 wherein the first accommodating space and the second accommodating space are at least partially in communication with each other, and form a channel for the cooling airflow to pass through.

12. The reciprocating saw as recited in claim 11 further comprising: a circuit board separating at least parts of the first accommodating space and the second accommodating space and being at least partially located at a junction of the first accommodating space and the second accommodating space.

13. The reciprocating saw as recited in claim 1 further comprising a balancing block extending in a direction of a third line; the direction of the third straight line being parallel to the output shaft.

14. The reciprocating saw as recited in claim 13 wherein the first gripping part extends in a direction of a fourth straight line, an acute included angle formed by the direction of the fourth straight line and the direction of the third straight line being greater than or equal to 15° and less than or equal to 35°.

15. The reciprocating saw as recited in claim 13 wherein the first gripping part extends in a direction of a fourth straight line, an acute included angle formed by the fourth straight line and the third straight line being 25°.

16. The reciprocating saw as recited in claim 13 wherein an acute included angle formed by the direction of the second gripping part straight line and the third straight line being greater than or equal to 55° and less than or equal to 75°.

17. The reciprocating saw as recited in claim 13 wherein an acute included angle formed by the direction of the second gripping part straight line and the third straight line being 60°.

18. The reciprocating saw as recited in claim 1 further comprising a control button, the first gripping part being directly connected to the control button.

19. The reciprocating saw as recited in claim 1 further comprising a control button, the second gripping part being spaced away from the control button.

20. A reciprocating saw comprising:
a housing formed with an accommodating space and a first gripping part for a user to grip;
an electric motor disposed in the accommodating space and including a winding extending in a direction of a first straight line;
a first transmission wheel disposed in the accommodating space and connected to the electric motor;
an output shaft reciprocating in a front-rear direction under a driving action of the electric motor;
the first transmission wheel being fixed in the accommodating space by a support shaft extending in a direction of a second straight line, and rotatable about the second straight line under the driving action of the electric motor;
the electric motor including a first end and a second end in the direction of the first straight line, and a first plane perpendicular to the first straight line and passing through a first end face of the first end being defined; a second plane perpendicular to the first straight line and passing through a second end face of the second end being defined, the first plane being parallel to the second plane, and the winding being located between the first plane and the second plane;
the support shaft being at least partially located between the first plane and the second plane;
wherein the support shaft has one end connected to the first transmission wheel; and
further comprising a second transmission wheel connected in a fixed manner to the first transmission wheel, wherein the second transmission wheel includes:
an eccentric block, formed with a connecting part connected to the first transmission wheel;
a transmission pin, extending in a direction of a third straight line and being formed on or connected to a side of the second transmission wheel remote from the eccentric block.

21. A reciprocating saw comprising:
a housing formed with an accommodating space and a first gripping part for a user to grip;
an electric motor disposed in the accommodating space and including a winding extending in a direction of a first straight line;
a first transmission wheel disposed in the accommodating space and connected to the electric motor;
an output shaft reciprocating in a front-rear direction under a driving action of the electric motor;
the first transmission wheel being fixed in the accommodating space by a support shaft extending in a direction of a second straight line, and rotatable about the second straight line under the driving action of the electric motor;
the electric motor including a first end and a second end in the direction of the first straight line, and a first plane perpendicular to the first straight line and passing through a first end face of the first end being defined; a second plane perpendicular to the first straight line and passing through a second end face of the second end being defined, the first plane being parallel to the second plane, and the winding being located between the first plane and the second plane;
the support shaft being at least partially located between the first plane and the second plane;
wherein the accommodating space formed by the housing includes a first accommodating space and a second accommodating space; the electric motor and the first transmission wheel being at least partially disposed in the first accommodating space, and the first gripping part being formed around the second accommodating space;
wherein an air inlet and an air outlet are formed on the housing, a fan being provided on the electric motor, and when the electric motor drives the fan to rotate, a cooling airflow flowing in through the air inlet and flowing out through the air outlet is formed;
wherein the first accommodating space and the second accommodating space are at least partially in communication with each other, and form a channel for the cooling airflow to pass through; and
further comprising a circuit board separating at least parts of the first accommodating space and the second accommodating space and being at least partially located at a junction of the first accommodating space and the second accommodating space.

\* \* \* \* \*